(12) United States Patent
Jiang et al.

(10) Patent No.: US 10,997,505 B1
(45) Date of Patent: May 4, 2021

(54) SYSTEMS AND METHODS FOR OPTIMIZING WEARABLE ITEM SELECTION IN ELECTRONIC CLOTHING SUBSCRIPTION PLATFORM

(71) Applicant: CaaStle, Inc., New York, NY (US)

(72) Inventors: Dongming Jiang, Los Angeles, CA (US); Li-Wei Chang, Millbrae, CA (US); Georgiy Goldenberg, Los Altos, CA (US); Krishnan Vishwanath, San Jose, CA (US)

(73) Assignee: CaaStle, Inc., New York, NY (US)

( * ) Notice: Subject to any disclaimer, the term of this patent is extended or adjusted under 35 U.S.C. 154(b) by 0 days.

(21) Appl. No.: 16/801,917

(22) Filed: Feb. 26, 2020

(51) Int. Cl.
  *G06N 5/02* (2006.01)
  *G06F 16/90* (2019.01)
  *G06F 1/16* (2006.01)
  *G06F 16/9035* (2019.01)

(52) U.S. Cl.
  CPC ............. *G06N 5/022* (2013.01); *G06F 1/163* (2013.01); *G06F 16/9035* (2019.01)

(58) Field of Classification Search
  CPC ...... G06F 1/163; G06F 16/9035; G06N 5/022
  See application file for complete search history.

(56) References Cited

U.S. PATENT DOCUMENTS

| | | | | |
|---|---|---|---|---|
| 2007/0294141 | A1* | 12/2007 | Bublitz | G06Q 30/02 705/26.62 |
| 2008/0126190 | A1* | 5/2008 | Gosnell | G06Q 30/0224 705/14.25 |
| 2014/0136560 | A1* | 5/2014 | Golshani | G06Q 30/0621 707/758 |
| 2016/0019626 | A1* | 1/2016 | Pham | G06O 30/0631 705/26.7 |
| 2017/0076011 | A1* | 3/2017 | Gannon | G06F 16/5866 |
| 2019/0073335 | A1* | 3/2019 | Foley | G06Q 30/0601 |
| 2019/0311423 | A1* | 10/2019 | Koren | G06Q 30/04 |
| 2019/0362397 | A1* | 11/2019 | Psota | G06Q 50/28 |

* cited by examiner

*Primary Examiner* — Kamran Afshar
*Assistant Examiner* — Urmana Islam
(74) *Attorney, Agent, or Firm* — Bookoff McAndrews, PLLC

(57) ABSTRACT

Disclosed are methods, systems, and non-transitory computer-readable medium for assigning wearable items in a subscription electronics transactions platform. For example, a method may include: generating a grid based on information regarding historically shipped wearable items, wherein the grid comprises at least a first cell and a second cell; determining an average percentage indicating how many wearable items have been used and an average predictive wearability metric for wearable items indicative of a propensity of a user to use the wearable items per number of wearable items shipped for each cell; generating a mapping configured to convert a predictive wearability metric to a squashed predictive wearability metric; and converting a first predictive wearability metric to a first squashed wearability metric based on the generated mapping.

20 Claims, 7 Drawing Sheets

SYSTEMS AND METHODS FOR OPTIMIZING WEARABLE ITEM SELECTION IN ELECTRONIC CLOTHING SUBSCRIPTION PLATFORM

TECHNICAL FIELD

Various embodiments of the present disclosure generally relate to systems and methods for optimizing wearable item selection in electronic clothing subscription platform, and more particularly, optimizing wearable item selection based on user satisfaction.

BACKGROUND

It is a challenge for rental clothing subscription services to optimize the selection and delivery of clothing in a way that maximizes both user satisfaction and business objectives. In particular, it can be difficult to determine optimization objectives of wearable item selection that are aligned with multiple types of business objectives. Some systems and methods for wearable item selection optimize wearable item selection based on users who have had positive and high wearability experiences (e.g., instances in which the users have used the selected wearable items) because wearability prediction for such users to wear high-quality garments may be relatively higher compared to other users. Therefore, it may in the best interest for such systems and methods to optimize wearable item selection such that high-quality garments are shipped to relatively satisfied users in order to maximize overall wearability. This may allow relatively satisfied users to remain satisfied, but may similarly cause relatively dissatisfied users to remain relatively dissatisfied. Accordingly, there is a need for an improved method of optimizing wearable item selection in electronic clothing subscription platforms.

The background description provided herein is for the purpose of generally presenting the context of the disclosure. Unless otherwise indicated herein, the materials described in this section are not prior art to the claims in this application and are not admitted to be prior art, or suggestions of the prior art, by inclusion in this section.

SUMMARY OF THE DISCLOSURE

According to certain aspects of the disclosure, systems and methods are disclosed for wearable item selection optimization in clothing subscription services based on user satisfaction to overcome the problems with conventional methods noted above.

In one embodiment, a computer-implemented method for assigning wearable items in a subscription electronics transactions platform comprises: generating, by one or more processors, a grid based on information regarding historically shipped wearable items, wherein the grid comprises at least a first cell and a second cell, wherein each cell includes a portion of the information regarding historically shipped wearable items corresponding to: (i) a category of percentages indicating how many wearable items have been used per number of wearable items shipped, and (ii) a category of predictive wearability metrics for wearable items indicative of a propensity of a user to use the wearable items; determining, by the one or more processors, an average percentage indicating how many wearable items have been used per number of wearable items shipped for each cell; determining, by the one or more processors, an average predictive wearability metric for wearable items indicative of a propensity of a user to use the wearable items for each cell; generating, by the one or more processors, a mapping configured to convert a predictive wearability metric to a squashed predictive wearability metric at least based on the average percentage and the average predictive wearability metric for each cell, wherein generating the mapping comprises determining a first difference metric indicating a difference in average percentage per difference in average predictive wearability metric between the first cell and the second cell, and wherein the generated mapping includes the first difference metric and the average percentage and wearability metric for the first cell; obtaining, by the one or more processors, information regarding a first pairing including a first unique user identifier and a first wearable item, wherein the information comprises: (i) a first predictive wearability metric associated with the first unique user identifier and the first wearable item, and (ii) a first percentage indicating how many wearable items have been used by the first user per number of wearable items shipped to the first user; determining, by the one or more processors, that the first predictive wearability metric falls under the category of predictive wearability metrics for wearable items for the first cell; determining, by the one or more processors, that the first percentage falls under the category of percentages indicating how many wearable items have been used per number of wearable items shipped for the first cell; converting, by the one or more processors, the first predictive wearability metric to a first squashed wearability metric based on the generated mapping; and determining, by the one or more processors, whether to assign the first wearable item to the first unique user identifier based on the first squashed wearability metric and/or the first predictive wearability metric.

In another embodiment, a computer system comprises: a data storage device storing processor-readable instructions; and a processor configured to execute the instructions to perform a method. The method may include: generating a grid based on information regarding historically shipped wearable items, wherein the grid comprises at least a first cell and a second cell, wherein each cell includes a portion of the information regarding historically shipped wearable items corresponding to: (i) a category of percentages indicating how many wearable items have been used per number of wearable items shipped, and (ii) a category of predictive wearability metrics for wearable items indicative of a propensity of a user to use the wearable items; determining an average percentage indicating how many wearable items have been used per number of wearable items shipped for each cell; determining an average predictive wearability metric for wearable items indicative of a propensity of a user to use the wearable items for each cell; generating a mapping configured to convert a predictive wearability metric to a squashed predictive wearability metric at least based on the average percentage and the average predictive wearability metric for each cell, wherein generating the mapping comprises determining a first difference metric indicating a difference in average percentage per difference in average predictive wearability metric between the first cell and the second cell, and wherein the generated mapping includes the first difference metric and the average percentage and wearability metric for the first cell; obtaining information regarding a first pairing including a first unique user identifier and a first wearable item, wherein the information comprises: (i) a first predictive wearability metric associated with the first unique user identifier and the first wearable item, and (ii) a first percentage indicating how many wearable items have been used by the first user per number of wearable items shipped to the first user; determining that the first predictive wearability metric falls under the category of predictive wearability metrics for wearable items for the first cell; determining that the first percentage falls under the category of percentages indicating how many wearable items have been used per number of wearable items shipped for the first cell; converting the first predictive wearability metric to a first squashed wearability metric based on the generated mapping; and determining whether to assign the first wearable item to the first unique user identifier based on the first squashed wearability metric and/or the first predictive wearability metric.

In another embodiment, there is provided a non-transitory computer-readable medium containing instructions that, when executed by a processor, cause the processor to perform a method. The method may include: generating a grid based on information regarding historically shipped wearable items, wherein the grid comprises at least a first cell and a second cell, wherein each cell includes a portion of the information regarding historically shipped wearable items corresponding to: (i) a category of percentages indicating how many wearable items have been used per number of wearable items shipped, and (ii) a category of predictive wearability metrics for wearable items indicative of a propensity of a user to use the wearable items; determining an average percentage indicating how many wearable items have been used per number of wearable items shipped for each cell; determining an average predictive wearability metric for wearable items indicative of a propensity of a user to use the wearable items for each cell; generating a mapping configured to convert a predictive wearability metric to a squashed predictive wearability metric at least based on the average percentage and the average predictive wearability metric for each cell, wherein generating the mapping comprises determining a first difference metric indicating a difference in average percentage per difference in average predictive wearability metric between the first cell and the second cell, and wherein the generated mapping includes the first difference metric and the average percentage and wearability metric for the first cell; obtaining information regarding a first pairing including a first unique user identifier and a first wearable item, wherein the information comprises: (i) a first predictive wearability metric associated with the first unique user identifier and the first wearable item, and (ii) a first percentage indicating how many wearable items have been used by the first user per number of wearable items shipped to the first user; determining that the first predictive wearability metric falls under the category of predictive wearability metrics for wearable items for the first cell; determining that the first percentage falls under the category of percentages indicating how many wearable items have been used per number of wearable items shipped for the first cell; converting the first predictive wearability metric to a first squashed wearability metric based on the generated mapping; and determining whether to assign the first wearable item to the first unique user identifier based on the first squashed wearability metric and/or the first predictive wearability metric.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION OF EMBODIMENTS

Figure 1:
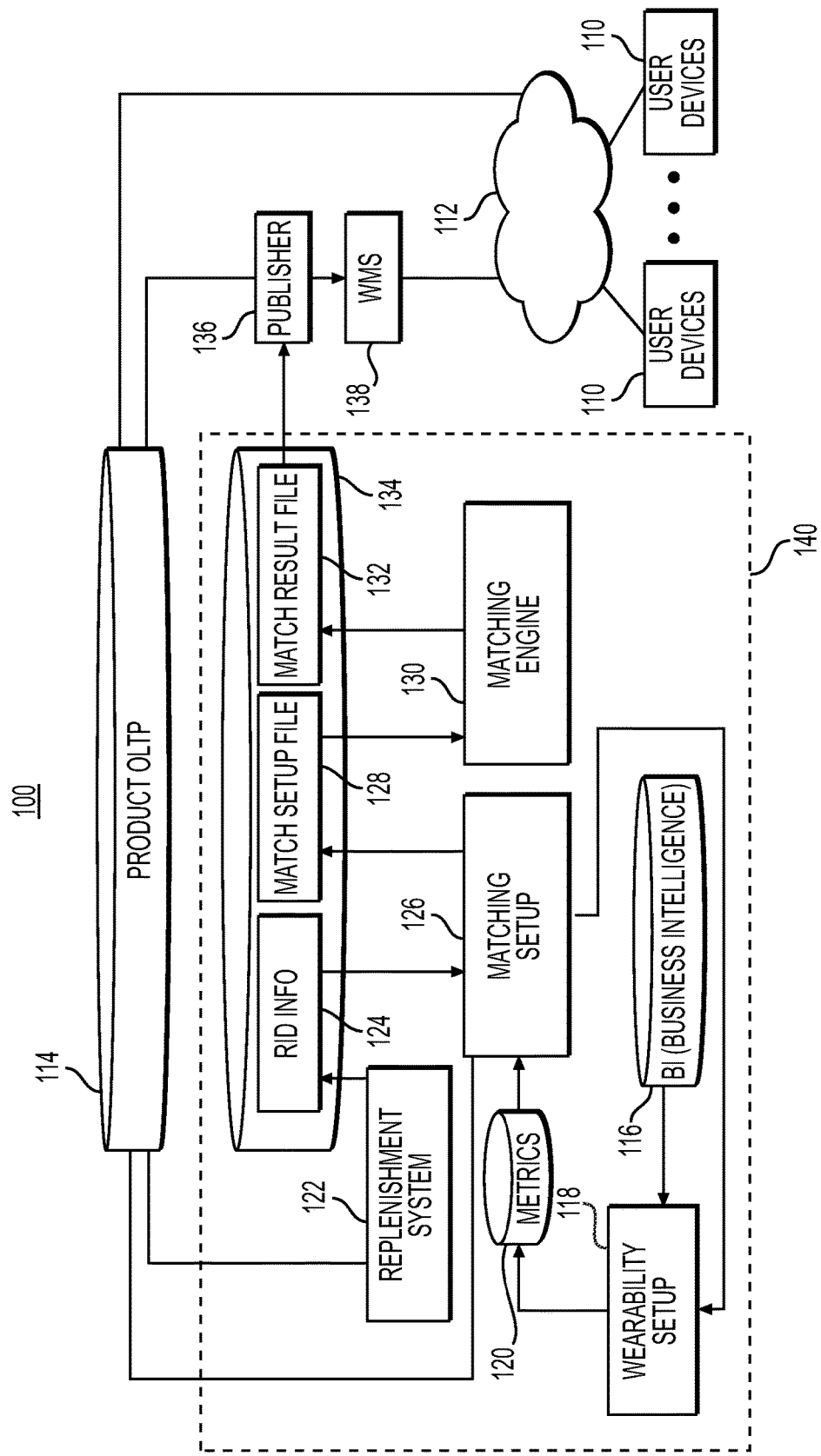
FIG. 1 depicts an example environment in which methods, systems, and other aspects of the present disclosure may be implemented.

Reference will now be made in detail to the exemplary embodiments of the disclosure, examples of which are illustrated in the accompanying drawings. Wherever possible, the same reference numbers will be used throughout the drawings to refer to the same or like parts.

In a rental clothing subscription service, a user may pick a wearable item the user may want to try on from a group of online collections provided by the rental clothing subscription service. The rental clothing subscription service may select and ship the selected wearable item to the user. In some embodiments, the process of service selection may be formalized as mathematical optimization in which user-garment worn may be maximized through a deep learning approach that may model (also referred to as a "wearability model") user experiences of wearing garments, compute the probability for a user to wear a garment (hereinafter referred to as "wearability") and maximize wearability in service selection. For example, various embodiments of determining such wearability metrics of wearable items are disclosed, for example, in U.S. patent application Ser. No. 16/275,989, filed Feb. 14, 2019, entitled "Systems and Methods for Automatic Apparel Wearability Model Training and Prediction," which is incorporated herein by reference in its entirety.

In some embodiments, a wearability model may be a general model that may take users' historical experience in addition to wearable item quality as inputs to predict the probability for matching a user and wearable item pair (e.g., a unique user identifier (UUID) and stockkeeping unit (SKU) pair). In some embodiments, the wearability model may predict high wearability scores for relatively satisfied users and predict low scores for relatively dissatisfied users. In some embodiments, a matching engine may receive such predicted wearability scores as inputs and determine allocation plans that may maximize the predicted wearability scores. For example, the matching engine may allocate relatively better wearable items (e.g., wearable items of relatively higher quality such as better fabric, better feedback, etc.) to relatively satisfied user, while sending relatively less better matched wearable items to relatively dissatisfied users. As noted above, this may allow relatively satisfied users to remain satisfied, but may similarly cause relatively dissatisfied users to remain dissatisfied.

As such, conventional modeling and learning approaches in wearable item selection optimization may be biased towards users and garments that have more historical and experience data than others. In this context, when the rental clothing subscription service has to make different selection decisions in order to fulfill all current user selections with limited inventory, maximization for wearability may be biased towards selection of high wearable garments to be shipped to users who have had experiences of high wearability, leaving out users who have had less desirable experiences due to low wearability.

In the presence of inventory limit and demand growth, it can be important for the rental clothing subscription services to satisfy as many users as possible. Accordingly, the current disclosure addresses the bias in wearable item selection by optimizing based not only overall wearability but also individual user satisfaction.

The current disclosure describes embodiments directed to a framework that may allow "squashing" in addition to maximizing wearability in optimization objectives for wearable item selection. In some embodiments, the squashing approach may segment users based on their past and current states of service satisfaction, compute user sensitivities to wearable item wearability, and transform wearability into squashed wearability that may measures user satisfaction with reference to a wearable item selection. Accordingly, the process of such wearable item selection may be formalized as mathematical optimization directed to maximizing squashed wearability, i.e., user satisfaction. In the context of the current disclosure, squashing may be referred to as a process of transforming a wearability score to an estimated satisfaction level, as will be described in further detail below. In some embodiments, the transformation may be based on how sensitive a user's satisfaction level is to the wearability score. The transformation may be different for different user segments, and user segments may be based on users' historical percentage worn. In the context of the current disclosure, historical percentage worn may refer to the ratio of worn wearable items per shipped wearable items to users. A user's satisfaction level may be estimated based on the percentage worn reflected by the user segment. For example, a relatively satisfied user with a user-level percentage worn of 80% or higher may be less picky with respect to selected wearable items and/or the user's body shape may be easier to be fit. Accordingly, the relatively satisfied user may be more likely to wear most shipped garments even when the wearability score associated with the shipped garments and the user is not ideal. In such instances, score squashing may allow for a matching engine to allocate desirable wearable items that may be in the relatively satisfied user's closet and users who are relatively sensitive to wearability scores. In the context of the current disclosure, a squashed score may be referred to as a probability that a user may wear a garment of a certain wearability score.

In the current disclosure, embodiments described herein may be directed to determining and implementing the transformation for score squashing. In some embodiments, squashed wearability scores may be utilized by a matching engine to maximize the overall user satisfaction across the electronic clothing subscription platform, as will be described in further detail below. As score squashing may be based on the sensitivity of a user's satisfaction to a wearability score, wearable item selection based on squashed scores may increase the overall satisfaction of users of the rental clothing subscription services, and result in higher conversion and retention of subscribers.

The following embodiments describe systems and methods for executing neural network training in order to dynamically predict apparel wearability and maximizing user satisfaction. As noted above, there exists a need for service providers (e.g., subscription-based service providers) to increase the likelihood of actual use and satisfaction of the service by its users, and to achieve such an increase of likelihood for as many users as possible despite their differences in individual tastes or preferences. A service platform with such an objective may include, for example an electronic platform that enable users to subscribe to, purchase, or rent apparel, operating under key considerations such as, for example, determining whether each subscriber actually wears the rented apparel in a particular rental cycle. The value of the service may improve greatly if the provider intelligently allocates or recommends apparel with higher probabilities of being worn by the user.

While the exemplary system architecture as described in the present disclosure relates to an electronic transactions for subscribing to, purchasing, or renting apparel (e.g., clothing-as-a-service (CaaS) or Try-Then-Buy (TTB) service), implementations disclosed herein may effectively serve any other subscription, product purchase, or online transaction service such as, for example, subscribing to or making purchases in a software service, cleaning service, delivery service, maintenance service, rental product, rental vehicles, etc., without departing from the scope of the disclosure. For example, the characteristic of being wearable or having a measure of high wearability (e.g., having propensity to wear apparel) and/or user satisfaction may correspond to a characteristic of being usable in contexts outside of apparel (e.g., having propensity to use a subscribed rental product or service).

In accordance with the present disclosure, allocating or recommending apparel and/or a virtual closet of apparel with a higher percentage of user satisfaction by the subscriber may be achieved by uniquely configured machine learning and predictive modeling. Given the vast amount of data attributes that may be collected from historical transactions, data sets indicative of each user's relationship with certain apparel (e.g., a binary flag of whether a shipped garment was actually worn by a user) may be formed and/or retrieved. Additionally, a computing system may transform such data sets to a training data set, and run neural network model training using the training data set. Within this process, specifically customized training of neural networks, combined with their practical application of constantly predicting wearability metrics and providing a user with highly wearable apparel, produces unconventional and unique automations which necessarily achieve technological improvements through the particular automation processes described more in detail below. Consequently, the unconventional and unique aspects of these automation processes represent a sharp contrast to merely providing a well-known or routine environment for performing a manual or mental task.

The subject matter of the present description will now be described more fully hereinafter with reference to the accompanying drawings, which form a part thereof, and which show, by way of illustration, specific exemplary embodiments. An embodiment or implementation described herein as "exemplary" is not to be construed as preferred or advantageous, for example, over other embodiments or implementations; rather, it is intended to reflect or indicate that the embodiment(s) is/are "example" embodiment(s). Subject matter can be embodied in a variety of different forms and, therefore, covered or claimed subject matter is intended to be construed as not being limited to any exemplary embodiments set forth herein; exemplary embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware, or any combination thereof (other than software per se). The following detailed description is, therefore, not intended to be taken in a limiting sense.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

The terminology used below may be interpreted in its broadest reasonable manner, even though it is being used in conjunction with a detailed description of certain specific examples of the present disclosure. Indeed, certain terms may even be emphasized below; however, any terminology intended to be interpreted in any restricted manner will be overtly and specifically defined as such in this Detailed Description section. Both the foregoing general description and the following detailed description are exemplary and explanatory only and are not restrictive of the features, as claimed.

As used in the present disclosure, the term "CaaS" (i.e., clothing-as-a-service) may collectively refer to computer-implemented services and functions associated with subscription, purchase, and/or rental services for users (e.g., periodic subscription for receiving apparel, apparel rental or purchase order, distribution, return processing, TTB services, account management, marketing, customer service, warehouse operations, etc.). As used in the present disclosure, the term "apparel" may refer to any article of clothing, apparel, jewelry, hat, accessories, or other product which may be worn by a user. In the context of the current disclosure, the term "apparel" may be used interchangeably with "garment" and "wearable item."

As used in the present disclosure, the term "wearability" may refer to a propensity or a probability of a user actually wearing a given garment, and the term "wearability metric" may be a metric indicating a level of wearability. As used in the present disclosure, "score squashing" may be referred to as a process of transforming a wearability metric to an estimated user satisfaction level. Accordingly, the term "squashed metric" may be referring a squashed wearability metric, i.e., a transformed wearability metric indicating an estimated user satisfaction level and/or an estimated value to a user. In the context of the current disclosure, a wearability metric that has not been squashed may be referred to as a "raw wearability metric." As used in the present disclosure, the term "closeting" or "to closet" may refer to a computer-implemented operation of placing one or more garments into a virtual closet (e.g., a cart, a repository, or any type of space which may be virtually associated with a particular set of one or more garments for a future transaction). Additionally, "matching" may refer to a computer-implemented operation of determining a set of one or more matching garments and/or determining wearability metrics for given garments, and "allocating" may refer to a computer-implemented operation of determining the garments that should be assigned and shipped to one or more particular users. In the context of the current disclosure, a user-garment pair may be referred to as a pairing of a unique user identifier (UUID) and a garment identifier, e.g., a stockkeeping unit (SKU).

In this disclosure, the term "based on" means "based at least in part on." The singular forms "a," "an," and "the" include plural referents unless the context dictates otherwise. The term "exemplary" is used in the sense of "example" rather than "ideal." The term "or" is meant to be inclusive and means either, any, several, or all of the listed items. The terms "comprises," "comprising," "includes," "including," or other variations thereof, are intended to cover a non-exclusive inclusion such that a process, method, or product that comprises a list of elements does not necessarily include only those elements, but may include other elements not expressly listed or inherent to such a process, method, article, or apparatus. Relative terms, such as, "substantially" and "generally," are used to indicate a possible variation of ±10% of a stated or understood value.

Referring now to the appended drawings, FIG. 1 shows an example environment 100, according to one or more embodiments of the present disclosure. As shown, the example environment 100 may include one or more user devices 110, a network 112, product online transaction processing (product OLTP) component 114, a publisher 136, warehouse management system (WMS) 138, and wearability modeling and matching system 140.

Users of the example environment 100 may use one or more user devices 110 (e.g., a computing device, a mobile device, or the like) to access and/or apply the results generated from the wearability modeling and matching system 140. The one or more user devices may be in communication with the product OLTP component 114, the WMS 138, and/or other user devices among the user devices 110, using a network 112. Further, the user devices 110 may allow a user to display a web browser, an application, or any other user interface for accessing information generated by product OLTP component 114, warehouse management system 138, and/or other user devices among the user devices 110. For example, a device among the one or more of the user devices 110 may load an application with graphical user interface (GUI), and the application may display on the GUI one or more apparel recommendations for closeting by the user.

The wearability modeling and matching system 140 may provide users with various features necessarily providing technical improvements over platforms which merely provide users with selection choices without wearability analysis functions. In some implementations, the wearability modeling and matching system 140, along with product OLTP component 114 and/or WMS 138, may provide a user with computer-implemented user-facing recommendations of apparel. These computer-implemented recommendations, for example, may uniquely take into account (i) which apparel(s) the particular user is likely to wear, (ii) apparel(s) similar to other apparel(s) which the particular user is likely to wear, (iii) apparel(s) with high wearability to other users who are similar to the particular user, (iv) apparel(s) with high wearability to other users who have had similar experiences with the particular user, and/or (v) user satisfaction with apparel(s) previously shipped to the user. In making such recommendations to the user interface, the wearability modeling and matching system 140, along with product OLTP component 114 and/or WMS 138, may use wearability metrics (e.g., raw wearability metrics and/or squashed metrics) as key considerations.

Additionally, or alternatively, the wearability modeling and matching system 140, along with product OLTP component 114 and/or WMS 138, may use wearability metrics (e.g., raw wearability metrics and/or squashed metrics) as key considerations for one or more closet curation features. For example, the environment 100 may assist user devices 110 (e.g., by providing recommendations for notifications) at purging or replacing apparel with low wearability and/or low user satisfaction based on one or more reasons such as size, seasonality, styles, fabric, and/or other advanced attributes. In these implementations, the wearability modeling and matching system 140, along with product OLTP component 114 and/or WMS 138, may select apparel with low wearability metrics (e.g., low raw wearability metrics and/or low squashed metrics as described in detail below) below a preset threshold value.

The product OLTP component 114 may be one or more computer-implemented data processing and storage systems configured to process online transactions from user devices 110. The product OLTP component 114 may process, for example, order entries, sales transactions, return processing, replenishment support/processing, and financial transactions. Further, the product OLTP component 114 may be in communication with at least the replenishment system 122, the publisher 136, and matching setup engine 126 with message bus or channels to exchange data with other connected systems. The publisher 136 may, for example, receive information from the product OLTP component 114 and communicate the received information to the WMS 138. The product OLTP component 114 may include, or be connected to, one or more databases with tables or any other data structures included therein. The one or more databases included in or connected to the product OLTP component 114 may be configured to receive and respond to queries for data associated with transactions. Additionally, or alternatively, the one or more databases in the product OLTP component 114 may be configured to transmit data at regularly scheduled intervals, transmit data via an asynchronous scheduling, and/or respond to authorized requests associated with reading, writing, and/or retrieving the data stored therein.

The wearability modeling and matching system 140 may provide an architecture for a plurality of sub-processes associated with predictive modeling and wearability matching/allocations, including generating analytics, wearability training, wearability prediction, and wearability matching. As supporting architecture for the sub-processes, the wearability modeling and matching system 140 may comprise various components, such as a BI (business intelligence) component 116, a wearability setup subsystem 118, a metrics database 120, a replenishment system 122, a match database 134, RID information repository 124, a matching setup engine 126, a match setup file repository 128, a matching engine 130, a match result file repository 132.

The BI component 116 may store and/or provide historical information stored in a data warehouse, as well as new data gathered from other source systems as they are generated, such as, for example, both historical analytics and real-time predictions. For example, the data stored and output by BI component 116 may comprise raw attributes from a data warehouse, historical shipping and RN (return notification) data, and historical closet data, as well as dynamic data feed from active closet, as described in more detail below. BI component 116 may serve as the sole source of data feed for wearability setup subsystem 118. Additionally, or alternatively, the wearability setup subsystem 118 may be in communication with, and receive data, from product OLTP component 114.

The wearability setup subsystem 118 may be in communication with BI component 116 and/or the product OLTP component 114, and may comprise a plurality of modules which perform wearability data preparation, wearability training, and wearability prediction. The individual modules which may perform these functions are described in detail below. The wearability setup subsystem 118 may receive input data from BI component 116, which may comprise, for example, raw attributes, historical shipping and return notification data, historical closet data, and active closet data. The receiving or streaming or input data from BI component 116 may run periodically, asynchronously, or via push and/or pull operations.

The wearability setup subsystem 118 may be in communication with a metrics database 120. The metrics database 120 may comprise data management components and/or databases such as, for example, Elasticsearch, Hbase, or any other data search/storage components capable of indexing, retrieving, and/or searching documents, or functioning as key-value-pair stores. The wearability setup subsystem 118 may transmit output data to the metrics database 120. The output data may be, for example, one or more predictive wearability metrics indicative of propensity to wear one or more garments. One or more predictive wearability metrics may, for example, be associated with a user and apparel pair. In some embodiments, the wearability setup subsystem 118 may transform such predictive wearability metrics into squashed wearability metrics which may indicate a predicted user satisfaction level with respect to the apparel included in the user and apparel pair. The specific functions by which the wearability setup subsystem 118 produces the output data based on the input data is described in further detail below.

The replenishment system 122 may be in communication with the product OLTP component 114, and may receive input data from the product OLTP component 114 periodically, asynchronously, or via push and/or pull operations (e.g., dynamic feed into the replenishment system 122). The input data may be, for example, return notification (RN) attributes of a user's RN, as well as any other data attributes associated with RN attributes. Based on the input data, the replenishment system 122 may generate replenishment identifiers (RIDs) for a user, along with any other data attributes associated with each RID. An RID may be, for example, an identifier generated by the replenishment system 122 in response to a user's RN and/or a detection that a user has an open slot and is eligible for next box and shipping. Additionally, or alternatively, the wearability setup subsystem 118 may generate RIDs in a wearability setup training module 204, as described in further detail below. The replenishment system 122 may transmit RIDs, along with any other data attributes associated with each RID, to a match database 134.

The match database 134 may be in communication with the replenishment system 122. The match database 134 may comprise one or more subcomponents such as, for example, RID information repository 124, a match setup file repository 128, and a match result file repository 132. The match database 134 may receive the RIDs (e.g., along with any other data attributes associated with each RID) and store the received data to RID information repository 124.

The matching setup engine 126 may be in communication with the metrics database 120, the match database 134, the RID information repository 124, match result file repository 132, and the product OLTP component 114. The matching setup engine 126 may be run in cycles, such as in periodic cycles (e.g., every hour), asynchronously, or via push and/or pull operations based on events such as generation of an RID. At each cycle, the matching setup engine 126 may receive one or more RIDs dynamically generated at the RID information repository 124. Additionally, or alternatively, the matching setup engine 126 may receive generated RIDs from the metrics database 120. For the received RIDs, the matching setup engine 126 may retrieve all data attributes or metadata related to those RIDs, such as unique user identifiers (e.g., UUIDs), unique apparel identifiers (e.g., SKU information), and/or any other data attributes associated with the unique user identifiers and/or apparel identifiers, from product OLTP component 114. In some implementations, the matching setup engine 126 may also receive data attributes associated with active closets or closeted apparel, from the product OLTP component 114, in order to generate match pairs based on active closet data.

The matching setup engine 126 may then dynamically generate match user and apparel pairs. In some embodiments, each match user and apparel pair may include a unique user identifier (e.g., UUID) and a unique apparel identifier (e.g., SKU) retrieved from the product OLTP component 114. The matching setup engine 126 may then retrieve a wearability metric associated with each match user and apparel pair from the metrics database 120, from the predictive wearability metrics stored at the metrics database 120. For example, for each match user and apparel pair (e.g., UUID-SKU), the matching setup engine 126 may make an online request to the metrics database 120, to retrieve a predictive wearability metric which may be associated with the match user and apparel pair (e.g., UUID-SKU), and store the retrieved predictive wearability metric as the match wearability metric for the match user and apparel pair, at the match setup file repository 128 in the match database 134.

In some implementations, the matching setup engine 126 may perform its functions in separate and independent cycles from the functions performed by wearability setup subsystem 118. For example, the wearability setup subsystem 118 may perform its functions of preparing and building wearability model, processing prediction data, and generating predictive wearability metrics offline (e.g., as back-end operation cycles which may be performed at different and independent schedules in comparison to the operation cycles performed by the matching setup engine 126) and store the output data in the metrics for ad hoc online retrievals by the matching setup engine 126. Such an implementation may achieve reduced online execution times of producing wearability metrics, in comparison to implementation in which wearability setup subsystem 118 and matching setup engine 126 perform operations together at each online request or each cycle iteration. The implementation of offline computations by wearability setup subsystem 118 (e.g., computations performed independently from online activities of the matching setup engine 126) may result in latency of data required at the matching setup engine 126, such as missing match pairs. To remedy such latency, if there exists a missing predictive wearability metrics for match pairs at matching setup engine 126, the matching setup engine 126 may generate an alert and/or fill the missing data with a default value (e.g., a neutral value such as 50%, or any other preset default value).

Alternatively, the wearability setup subsystem 118 and the matching setup engine 126 perform operations together in each cycle iteration, such that predictive wearability metrics are generated online for immediate use by the matching setup engine 126 (e.g., without any latency caused by independently performed storage operations, or without a need for the metrics database 120). Such implementation of online metrics computation may eliminate latency of data between the wearability setup subsystem 118 and the matching setup engine 126, and also enable the online retrieval services to be used by other subsystems (e.g., subsystems within the environment 100, and/or subsystems in communication with the environment 100). This implementation may result in higher online execution times of producing wearability metrics, in comparison to the offline computation implementation described above.

The matching engine 130 may be in communication with the match setup file repository 128 and the match result file repository 132. The matching engine 130 may run in cycles, such as in periodic cycles (e.g., every hour), asynchronously, or via push and/or pull operations. The matching engine 130 may run in the same, synchronous cycles as the matching setup engine 126. At every cycle, the matching engine 130 may receive input data from the match setup file repository 128, such as the stored match wearability metrics for one or more match pairs. Based on the received data, the matching engine may generate, for example, two result files for each match pair. A first result file may have the wearability metrics associated with the match pair, such as, for example, raw wearability metric(s) and squashed wearability metric(s). In some embodiments, the first result file may further include an expected wearability probability, average wearability rate, priority success rate, missing keys at match-setup time, and number of matches-in-picking without computed metrics. A second result file may have cost-function results for the matching optimization which may be calculated by, for example, first calculating an adjusted score as adjusted score=I(is_prioritized)*x*match wearability metric, and then calculating the cost for matching allocation as x-adjusted score. The result files may be then stored at the match result file repository 132.

The match result file repository 132 may be in communication with the matching engine 130 and the publisher 136. The publisher 136 may be in communication with WMS 138. Both the publisher 136 and WMS 138 may be in communication with the user devices 110 via the network 112. The publisher 136 may retrieve data attributes from the result files stored in the match result file repository 132, and output data from the result file (e.g., wearability metrics, average wearability rate, priority success rate, missing keys at match-setup time, and number of matches-in-picking without computed metrics) in a specifically preset or default publishing format. The output of the publisher 136, for example, may be retrieved directly by the user devices 110, or by the WMS 138. The WMS 138 may be connected to the user devices 110 via the network 112. The WMS 138 may perform functions of, for example, storing and/or transmitting warehouse management data attributes derived or generated based on the output of the publisher 136.

The number and arrangement of devices, networks, and components shown in FIG. 1 are provided as an example. In practice, there may be additional devices and/or components, fewer devices and/or components, different devices and/or components, or differently arranged devices and/or components than those shown in FIG. 1. Furthermore, two or more devices or components shown in FIG. 1 may be implemented within a single device, or a single device shown in FIG. 1 may be implemented as multiple, distributed devices. Additionally, or alternatively, a device or component of environment 100 may perform one or more functions described as being performed by another device or component of environment 100.

Figure 2:
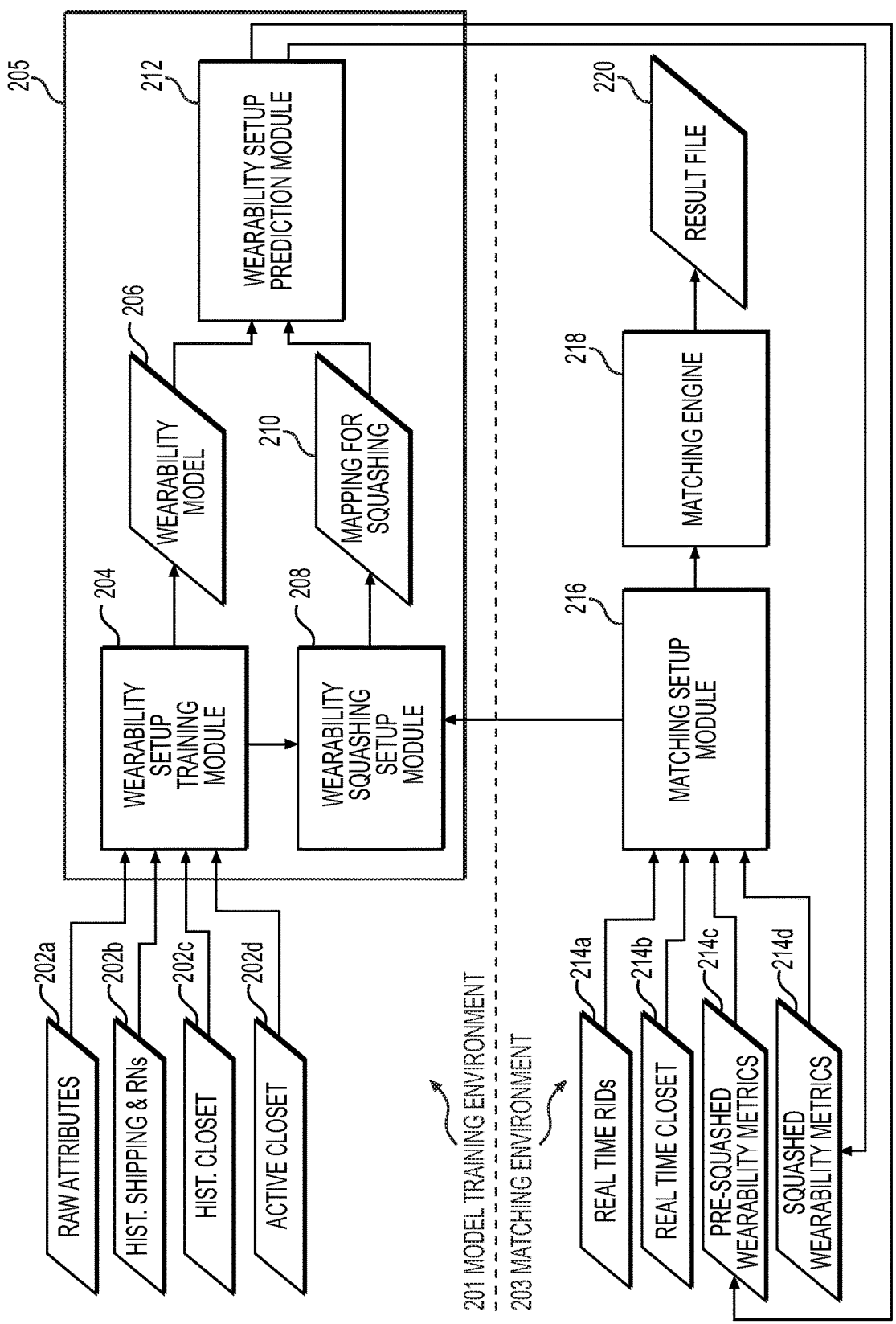
FIG. 2 depicts a block diagram schematically showing a system architecture and data flow in an exemplary implementation of the wearability modeling and matching system, according to one or more embodiments.

FIG. 2 depicts a block diagram schematically showing a system architecture and data flow in an exemplary environment 200 of the wearability modeling and matching system, according to one or more embodiments. The exemplary environment 200 may have two processes which run respectively in two computing environments, such as a model training environment 201 and a matching environment 203. The model training environment 201 may be implemented using, for example, SQL and/or Python. It is understood that any appropriate language may be utilized to implement the model training environment 201 in alternative embodiments. The matching environment 203 may be implemented using, for example, Java or any other programming language capable of conditional matching algorithms. As described above with respect to FIG. 1, the model training environment 201 may host an offline process of predictive wearability metrics computations, which may not need to run in real-time to any operation of the matching environment 203, or be executed online together with any online process of the matching environment 203. Alternatively, the model training environment 201 and the matching environment 203 may both run online (e.g., both running a cycle in each online process), such that predictive wearability metrics are generated online for immediate use without any data latency.

The model training environment 201 may comprise a wearability setup subsystem 205, which may execute a plurality of different modules (e.g., a wearability setup training module 204, a wearability squashing setup module 208, and a wearability setup prediction module 212). These modules may be software instructions executed by one or more processors associated with the wearability setup subsystem 205. In some implementations, the wearability setup subsystem 205 may correspond to the wearability setup subsystem 118 of FIG. 1.

The wearability setup subsystem 205 may receive various data attributes in order to build a training data set for neural network training, and to generate prediction data such as, e.g., predictive wearability metrics (e.g., raw wearability metrics and/or squashed wearability metrics) associated with user-garment pairs. The data attributes received may include raw attributes 202a, historical shipping and RNs 202b, historical closet data 202c, and active closet data 202d, and the data attributes may be received from the BI component 116 and/or product OLTP component 114, as described above with reference to FIG. 1.

The wearability setup training module 204 may prepare and process modeling data, which may be needed for the machine learning process of models that produce predictive wearability metrics. First, in input data, such as raw attributes 202a, historical shipping and RNs 202b, and historical closet data 202c, may be received from BI component 116 and/or product OLTP component 114. In some embodiments, the historical shipping and RNs 202b may include associated percentage worn responses from the users. For example, a RN may include a user-garment pair and a response from the user indicating whether the user had used the garment. In some embodiments, the response from the user may indicate how many times the user had used the garment. In some implementations, the raw attributes 202a may be gathered and placed into advanced analytics tables.

Based on the advanced analytics tables, raw attributes 202a, historical shipping and RNs 202b, and/or historical closet data 202c, the wearability setup training module 204 may join feature vectors for pairs that have been shipped (hereinafter referred to as shipped pairs) with RNs. For example, shipped pairs of garments may form a vector such as (UUID, SKU, shipped date), and this vector may be joined with features having analytics (e.g., analytics from the advanced analytics tables, or any other user/SKU/apparel/closet level attributes retrieved from raw attributes 202a, historical shipping and RNs 202b, and/or historical closet data 202c). As used herein, a feature may refer to any analytics used in the model training environment 201, and an analytic may refer to any user/SKU/apparel/closet level attribute.

Then, these joined vectors may be downloaded into one or more data files (e.g., one or more csv files, or any other one or more types of data files capable of storing joined vectors), and the criteria for such downloading may be limited by conditions if there are preset conditions. For example, there may be a condition that only apparel shipped in the past x days (e.g., 90 days) may be loaded into the csv files. With the data set from the one or more csv files, the wearability setup training module 204 may then clean the data set, based on further conditions. For example, the wearability setup training module 204 may detect a preset condition that data associated with historical feedback from users may be used if the data has an RN count (e.g., number of RNs received regarding that apparel or that user) over 5, or any other preset threshold value. In this example, any data with less than or equal to the preset threshold value may be voided from the data set as part of the cleaning process.

After cleaning the data, the wearability setup training module 204 may then transform the data set by running the data set into additional filters and conversions. For example, features having at least x % of missing data attributes (e.g., with x being a preset number such as, for example, 50) may be removed from the data set. In addition, categorical features may be dummified. In the context of the current disclosure, the term "dummified" may refer to one or more methods of expanding a categorical feature to multiple binary features. For example, a categorical feature named "gender" may have two possible values: male and female. When the categorical feature "gender" is dummified, two columns may be generated: "is_male" and "is_female." For data sets associated with a user whose gender is male, the "is_male" may be set as TRUE while "is_female" may be set as FALSE, and vice versa. In some instances, this "dummifying" process may be referred to as "one-hot encoding." Additionally, missing features may be imputed by, for example, searching for the missing feature value from other places (e.g., BI component 116, product OLTP component 114, or any other database or internal storage accessible by wearability setup subsystem 205), and/or filling the missing features with default, preset value. In some embodiments, a preset value may be dynamically determined based on training data. For example, the preset value may be the average value of a certain group of users with similar attributes (e.g., preset value of a missing percentage worn for trial users may be the average of historical percentage worn of trial users in the training dataset. Additionally, the features may also be normalized, by realigning or adjusting values based on a preset factor, removing outliers, and/or standardizing the values in any way in accordance with preset rules or conditions. In some implementations, the wearability setup training module 204 may save the resulting training data set as modeling ETL (Extract, Transform, Load) objects in one or more target databases in communication with wearability setup subsystem 205.

The wearability setup training module 204 may perform the training process for producing models, using the training data set. In some embodiments, the wearability setup training module 204 may use the training data set (e.g., by receiving the training data set and/or retrieving the training data set stored at designated files and locations) for a neural network training process. As discussed above, the training process may be performed as an offline process, and as such, may run fewer, independent cycles (e.g., 1-3 times a day as opposed to hourly) compared to the matching operations of the matching environment 203. In each cycle of training, a neural network may be trained based on the training data set. As used herein, a neural network may be, for example, a deep learning neural network that has more layers than traditional neural network. The wearability setup training module 204 may train a neural network such that trained models, e.g., wearability model 206, may be configured to output a metric for any pair of a unique user identifier and a unique apparel identifier (e.g., a predictive wearability metric indicative of propensity to wear, which may be a predicted wearability score based on a predictive modeling from the training or a default wearability score). In some embodiments, the wearability model 206 may comprise one or more of TTB modeling and prediction, garment utilization modeling and prediction, etc. For example, the output metric may be an average rate that a given garment was reported as worn (e.g., binary flag of worn vs. not worn in user-provided RNs) by a given set of users (the user corresponding to the UUID, or a set of users associated with that user based on user attributes). After a cycle of training a neural network, one or more trained models resulting from the training may be stored as trained model objects in one or more databases in communication with wearability setup subsystem 205.

In some implementations, the wearability setup subsystem 205 may also evaluate the trained model objects, by executing or simulating the trained model objects, e.g., wearability model 206, generated at the wearability setup training module 204, and assessing the objects. For example, the assessment may comprise predicting wearability metrics for training pairs, and calculating assessment metrics such as accuracy, AUC (Area Under the Curve), precision, recall, etc. The AUC may, for example, be used in a classification analysis in order to determine which of the model objects best predicts classes.

The wearability setup prediction module 212 may collect and prepare data to generate predictive wearability metrics. In some embodiments, the wearability setup prediction module 212 may collect data as close to real-time as possible. For example, if a user just closeted a new garment and/or return notified (e.g., sent an RN for) a garment, the wearability setup prediction module 212 may capture data attributes associated with all of those activities, because obtaining or missing one data attribute for a user may have an effect on the predictive wearability metrics produced by the wearability setup prediction module 212. The active closet data may be received from BI component 116. Active data related to RNs may be received from, for example, the wearability setup training module 204. Additionally, the wearability setup prediction module 212 may not only capture new closeting or RN data relationships (e.g., UUID-SKU relationship), but also collect data attributes related to the relationship (e.g., details regarding each SKU on attribute levels), from the BI component 116, the wearability setup training module 204, or any other databases in in communication with the environment 200.

In some embodiments, the wearability setup prediction module 212 may define the universe of the closeted pairs of unique user identifiers and unique apparel identifiers based on the collected data. The wearability setup prediction module 212 may then join advanced features (e.g., advanced analytics tables described with respect to processing modeling data) for the closeted pairs. The closeted files may then be downloaded into one or more csv files. With the data set from the one or more csv files, the wearability setup prediction module 212 may then clean the data set, based on further conditions. For example, wearability setup prediction module 212 may detect a preset condition that data associated with historical feedback from users may be used only if the data has an RN count (e.g., number of RNs received regarding that apparel or that user) over 5, or any other preset threshold value. In this example, any data with less than or equal to the preset threshold value may be voided from the data set as part of the cleaning process.

After cleaning the data, the wearability setup prediction module 212 may then transform the data set by running the data set into additional filters and conversions. For example, model ETL objects (saved by the wearability setup training module 204) may be loaded. In addition, categorical features may be dummified, as explained above. Additionally, missing features may be imputed by, for example, searching for the missing feature value from other places (e.g., BI component 116, product OLTP component 114, or any other database or internal storage accessible by wearability setup subsystem 205), and/or filling the missing features with default, preset value. In some embodiments, a preset value may be dynamically determined based on training data. For example, the preset value may be the average value of a certain group of users with similar attributes (e.g., preset value of a missing percentage worn for trial users may be the average of historical percentage worn of trial users in the training dataset. Additionally, the features may also be normalized, by realigning or adjusting values based on a preset factor, removing outliers, and/or standardizing the values in any way in accordance with preset rules or conditions. As a result of these transformations, the prediction data may be prepared and become available for the module for the wearability setup prediction module 212.

The wearability setup prediction module 212 may then run prediction on the prediction data, by predicting one or more predictive wearability metrics, e.g., raw wearability metrics, indicative of propensity to wear. Such a prediction may occur by loading the stored one or more trained model objects, executing the trained model objects with the prediction data, and generating predictive wearability metrics resulting from the execution of the training model objects. In some implementations, the wearability setup prediction module 212 may also predict metrics or scores for training pairs (e.g., for purposes of assessment or training associated with the prediction process). The wearability setup prediction module 212 may then store the resulting predictive wearability metrics in metrics database 120, as described above with respect to FIG. 1.

In some embodiments, the wearability setup prediction module 212 may calculate squashed wearability metrics at least based on the resulting predictive wearability metrics and a mapping for squashing 210 as will be described in further detail below. In such embodiments, wearability setup prediction module 212 may store the squashed wearability metrics in addition to the raw wearability metrics in the metrics database 120.

The wearability squashing setup module 208 may be configured to obtain pairs (e.g., UUID and SKU pairs) with RN and scores associated with the obtained pairs from the wearability setup training module 204 and/or the matching setup module 216. The wearability squashing setup module 208 may then determine the mapping for squashing 210 based on the obtained pairs with RN and associated scores, as will be described in further detail with reference to FIGS.

3-4. The wearability squashing setup module 208 may provide the mapping for squashing 210 to the wearability setup prediction module 212.

Referring back to the wearability setup prediction module 212 may squash the raw wearability metrics, i.e., transform raw wearability metrics to estimated user satisfaction levels, at least based on the mapping for squashing 210. In some embodiments, the wearability setup prediction module 212 may obtain estimated percentage worn by users, as described in further detail below. In such embodiments, the wearability setup prediction module 212 may squash raw wearability metrics at least based on the obtained estimated percentage worn by the users and the mapping for squashing 210.

In the matching environment 203, match wearability metrics and cost-function outputs may be generated. Based on predictive wearability metrics (e.g., the squashed wearability metrics 214d and raw wearability metrics 214c (also referred to as pre-squashed wearability metrics 214c)) output from the wearability setup prediction module 212, as well as real-time RIDs 214a and real-time closet 214b received from the product OLTP component 114 and/or the RID information repository 124, the matching environment 203 may dynamically generate result file 220 having match wearability metrics and cost-function outputs. This process may be performed by matching setup engine 216 and matching engine 218, which have been described in detail with respect to FIG. 1 above. For example, in some implementations, matching setup engine 216 may correspond to the matching setup engine 126 of FIG. 1, and the matching engine 218 may correspond to the matching engine 130 of FIG. 1.

The number and arrangement of devices, networks, and modules shown in FIG. 2 are provided as an example. In practice, there may be additional devices and/or modules, fewer devices and/or modules, different devices and/or modules, or differently arranged devices and/or modules than those shown in FIG. 2. Furthermore, two or more devices or modules shown in FIG. 2 may be implemented within a single device, or a single device shown in FIG. 2 may be implemented as multiple, distributed devices. Additionally, or alternatively, a device or a module of environment 200 may perform one or more functions described as being performed by another device or module of environment 200.

Figure 3:
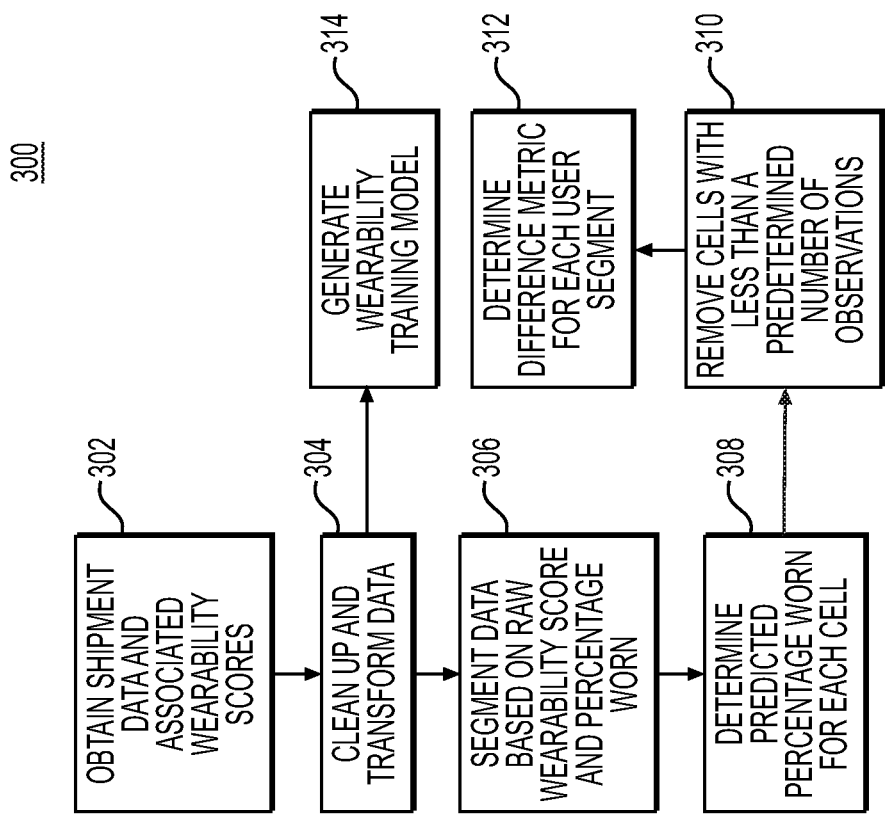
FIG. 3 depicts an exemplary method of wearability modeling and matching, according to one or more embodiments.

FIG. 3 depicts an exemplary method 300 of training a wearability model and determining a mapping for squashing according to some embodiments. As shown in FIG. 3, the method 300 may begin with step 302 in which current and/or previous shipment data (hereinafter referred to as shipment data) (including matching setup, allocation result, replenishment, etc.) along with associated wearability scores may be obtained and the shipment data may be combined with the associated wearability scores to form a data set. In some embodiments, the shipment data may include information associated with shipped garments within a predetermined period of time. For example, the shipment data may include information associated with garments shipped within a month prior to a certain shipping date. In some embodiments, the shipment data may include one or more user and apparel pairs with associated predictive wearability metrics (e.g., raw wearability metrics and squashed wearability metrics). In such embodiments, the user and apparel pairs with associated predictive wearability metrics may be retrieved from the match setup file repository 128 in the match database 134. In some embodiments, the previous shipment data may be retrieved from the published data, e.g., information published by publisher 136. For example, the publisher 136 may publish wearability scores when wearable items are in a fulfilling process. As another example, the matching setup module 216 may publish raw wearability scores associated with a matched user-garment pair. In such instances, the publisher 136 may publish both the raw wearability scores and the squashed wearability scores associated with the matched user-garment pair when RIDs are generated.

In step 304, the obtained data may be cleaned up and transformed. For example, a preset condition may be detected where data associated with historical feedback from users may be used only if the data has an RN count (e.g., number of RNs received regarding that apparel or that user) over 5, or any other preset threshold value. In some instances, the RN count may be referred to as observations. In this example, any data with less than or equal to the preset threshold value may be voided from the data set as part of the cleaning process. After cleaning the dataset, the dataset may be transformed by running the dataset into additional filters and conversions, as described above with reference to the wearability setup training module 204 of FIG. 2.

In step 306, the cleaned up and transformed data may be segmented based on allocated wearability scores and user historic percentage worn. As noted above, garment quality for a particular garment may be measured by a user's wearability score associated with the particular garment. Each user may exhibit different sensitivity to the quality of a garment in terms of wearing it. Users with similar historic percentage worn may, however, behave similarly with respect to change in the quality of the garment. Accordingly, a probability of a user wearing a garment may be predicted for any user based on a relation between a segment indicative of the historic percentage worn and a segment indicative of an allocated wearability score. Accordingly, segments of allocated wearability score may be determined based on the transformed data, thereby providing discrete points with respect to the wearability score to compute a difference, as described in further detail below with reference to step 312. In some embodiments, segments of historic percentage worn may include the following exemplary ranges: (i) greater than 0% and less than or equal to 20%, (0.0, 0.2], (ii) greater than 20% and less than or equal to 40%, (0.2, 0.4], (iii) greater than 40% and less than or equal to 50%, (0.4, 0.5], (iv) greater than 50% and less than or equal to 60%, (0.5, 0.6], (vi) greater than 60% and less than or equal to 70%, (0.6, 0.7], (vii) greater than 70% and less than or equal to 80%, (0.7, 0.8], (viii) greater than 80% and less than or equal to 90%, (0.8, 0.9], and (ix) greater than 90% and less than or equal to 100%, (0.9, 1.0]. In some embodiments, segments of allocated wearability score may include similar exemplary ranges. It is understood that the ranges for the segmented historic percentage worn and the allocated wearability score may be adjusted as appropriate in alternative embodiments. Accordingly, a grid comprising rows of segmented ranges of historic percentage worn and columns of segmented ranges of allocated wearability scores may be determined. The grid may comprise a plurality of cells, each cell associated with a specific allocated wearability score range and a specific historic percentage worn range.

In step 308, the percentage worn may be calculated for every cell. In some embodiments, the average wearability score and the historic percentage worn may be determined for each cell. Accordingly, the average wearability score and the average historic percentage worn may be indicative of the actual wearability score and historic percentage for each cell. Table 1 below provides a portion of a grid corresponding to a user segment range of (0.6, 0.7], several wearability score segment ranges, average wearability scores for each cell (e.g., each cell corresponds to a specific wearability score segment ranges and a specific user segment range such as (0.0, 0.2] and (0.6, 0.7], respectively), average historic percentage worn for each cell, and number of observations for each cell. For ease of explanation and simply for the purpose of clarity, cell numbers have been included in Table 1.

TABLE 1

| Cell | User Segment | Average Wearability Score | Average historic percentage worn | Wearability score segment | Number of Observations |
|---|---|---|---|---|---|
| 1 | (0.6, 0.7] | 0.16 | 36% | (0.0, 0.2] | 323 |
| 2 | (0.6, 0.7] | 0.34 | 43% | (0.2, 0.4] | 6,145 |
| 3 | (0.6, 0.7] | 0.46 | 52% | (0.4, 0.5] | 10,591 |
| 4 | (0.6, 0.7] | 0.55 | 60% | (0.5, 0.6] | 13,713 |
| 5 | (0.6, 0.7] | 0.64 | 67% | (0.6, 0.7] | 8,679 |
| 6 | (0.6, 0.7] | 0.73 | 72% | (0.7, 0.8] | 1,952 |
| 7 | (0.6, 0.7] | 0.84 | 71% | (0.8, 0.9] | 213 |
| 8 | (0.6, 0.7] | 0.93 | 73% | (0.9, 1.0] | 22 |
| 9 | (0.6, 0.7] | N/A | 64% | N/A | 540 |

In step 310, cells with less than a predetermined number of observations may be removed. For example, cells that include a number of data points that fall below the predetermined number of observations, e.g., 50, may be removed as shown below in Table 2 (the removed cell 8 is shown as a line strike through each corresponding column).

TABLE 2

| Cell | User Segment | Average Wearability Score | Average historic percentage worn | Wearability score segment | Number of Observations |
|---|---|---|---|---|---|
| 1 | (0.6, 0.7] | 0.16 | 36% | (0.0, 0.2] | 323 |
| 2 | (0.6, 0.7] | 0.34 | 43% | (0.2, 0.4] | 6,145 |
| 3 | (0.6, 0.7] | 0.46 | 52% | (0.4, 0.5] | 10,591 |
| 4 | (0.6, 0.7] | 0.55 | 60% | (0.5, 0.6] | 13,713 |
| 5 | (0.6, 0.7] | 0.64 | 67% | (0.6, 0.7] | 8,679 |
| 6 | (0.6, 0.7] | 0.73 | 72% | (0.7, 0.8] | 1,952 |
| 7 | (0.6, 0.7] | 0.84 | 71% | (0.8, 0.9] | 213 |
| ~~8~~ | ~~(0.6, 0.7]~~ | ~~0.93~~ | ~~73%~~ | ~~(0.9, 1.0]~~ | ~~22~~ |
| 9 | (0.6, 0.7] | N/A | 64% | N/A | 540 |

In step 312, a difference metric for each user segment may be determined. In some embodiments, a difference metric between each user segment of the grid may be determined based on the average wearability score and the average historic percentage worn. In some embodiments, the determined difference metric may indicate an assumed percentage worn per score change. For example, referring to Table 2, the difference metric between each user segment may be provided as shown below in Table 3.

TABLE 3

| Historic percentage worn per wearability score change |
|---|
| 0.42 |
| 0.71 |
| 0.87 |
| 0.76 |
| 0.55 |
| 0.00 |

As an exemplary illustration, the difference metric of 0.42 may be obtained by the following calculation based on the numbers obtained from Table 2 above:

0.42=function of (0.43,0.36,0.34,0.16)=function of ((average historic percentage worn of cell 2), (average historic percentage worn of cell 1), (average wearability score of cell 2),(average wearability score of cell 1)).

It is understood that the remaining difference metrics may be determined similarly.

In some embodiments, the mapping for squashing 210 may include the determined difference metrics for each user segment as shown below in Table 4.

TABLE 4

| User Segment | Average Wearability Score | Average Historic Percentage Worn | Difference metric |
|---|---|---|---|
| (0.6, 0.7] | 0.00 | 29% | 0.42 |
| (0.6, 0.7] | 0.34 | 43% | 0.71 |
| (0.6, 0.7] | 0.46 | 52% | 0.87 |
| (0.6, 0.7] | 0.55 | 60% | 0.76 |
| (0.6, 0.7] | 0.64 | 67% | 0.55 |
| (0.6, 0.7] | 0.73 | 72% | 0.00 |
| (0.6, 0.7] | N/A | 64% | — |

In some embodiments, a beginning cell for the mapping for squashing 210 may be extrapolated. For example, the beginning cell for may be based on the average historic percentage worn for the first cell and the average wearability score for the first cell. In some embodiments, the wearability setup prediction module 212 may utilize the mapping for squashing 210 to transform raw wearability metrics into squashed wearability metrics, as described in further details below with reference to FIG. 4.

In step 314, a wearability training model may be generated further based on the cleaned and transformed data in step 304. In some embodiments, the wearability model 206 trained by the wearability setup training module 204, as described above with reference to FIG. 2, may be generated and/or updated based on the cleaned and transformed data in step 304. The generated wearability training model may be utilized by the wearability setup prediction module 212 to generate one or more predictive wearability metrics, e.g., raw wearability metrics, in some embodiments.

Figure 4:
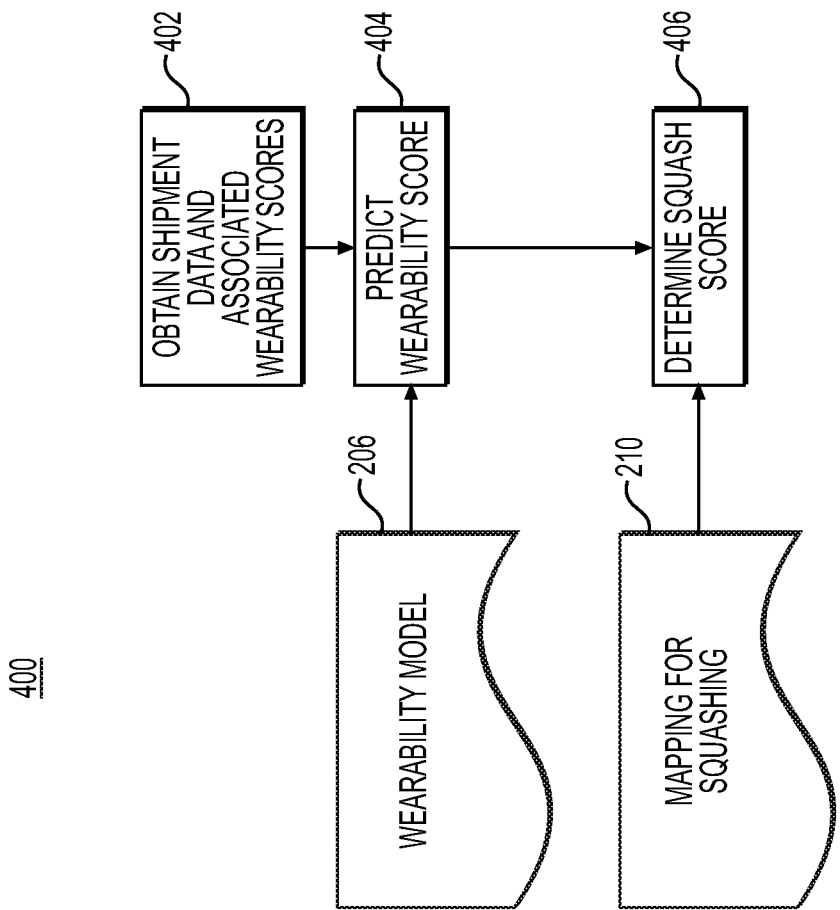
FIG. 4 depicts an exemplary method of wearability modeling and matching, according to one or more embodiments.

FIG. 4 depicts an exemplary method 400 of determining a squashed score according to some embodiments. As shown in FIG. 4, method 400 may being with step 402, in which shipment data may be obtained as described above with reference to the wearability setup training module 204 and the wearability squashing setup module 208 of FIG. 2 and step 302 of FIG. 3.

In step 404, the wearability model 206 may be used to generate a predictive wearability score, e.g., a raw wearability metric. In some embodiments, the wearability setup prediction module 212 may utilize the wearability model 206 to generate the predictive wearability score, e.g., raw wearability score. In step 406, the squashed wearability metric may be computed based on the mapping for squashing 210. In some embodiments, the wearability setup prediction module 212 may utilize the mapping for squashing 210 to transform raw wearability metrics into squashed wearability metrics. In some embodiments, the squashed score associated with a user and apparel pair may be based on which cell the user and apparel pair belong to. For example, four user and apparel pairs (e.g., UUID-SKU pairs) may be obtained for squashing. As shown in Table 5 below, each user and apparel pair may be associated with a user historic percentage worn and a wearability score (also referred to as a raw wearability metric or pre-squashed wearability score).

TABLE 5

| UUID | SKU | User historic percentage worn | Pre-squashed wearability score |
|------|-----|-------------------------------|--------------------------------|
| U1 | S1 | 0.62 | 0.35 |
| U1 | S2 | 0.62 | 0.65 |
| U2 | S3 | 0.68 | 0.82 |
| U3 | S1 | 0.63 | N/A |

The squashed wearability scores for each of the above noted user and apparel pairs may be determined based on the mapping for squashing 210. For example, the mapping for squashing 210 depicted above in Table 4 may be utilized to determine the squash scores as shown in Table 6 below.

TABLE 6

| UUID | SKU | User historic percentage worn | Pre-squashed wearability score | Squashed score |
|------|-----|-------------------------------|--------------------------------|----------------|
| U1 | S1 | 0.62 | 0.35 | 0.44 |
| U1 | S2 | 0.62 | 0.65 | 0.68 |
| U2 | S3 | 0.68 | 0.82 | 0.72 |
| U3 | S1 | 0.63 | N/A | N/A |

In some embodiments, the squashed scores may be determined by interpolation based on the mapping for squashing 210. Specifically, the squashed scores may be determined by using a row in the mapping for squashing 210 associated with an average wearability score just less than the wearability score associated with the user and apparel pair. For example, the wearability score associated with U1-S1 is 0.35 as shown in Table 5. Accordingly, the wearability score just lower than 0.35 included in the mapping for squashing 210 may be 0.34. As such, the information associated with the 0.34 wearability score (e.g., the row including the 0.34 average wearability score, 43% average historic percentage worn, and 0.71 difference metric) may be used to determine the squashed score for U1-S1.

Figure 5:
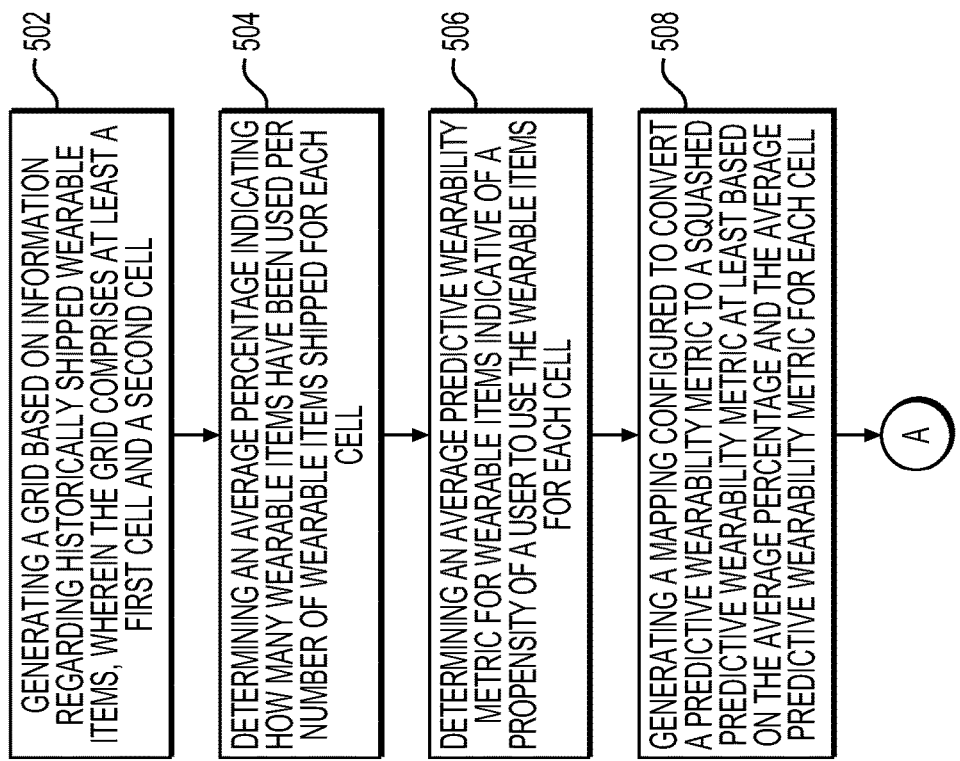
FIG. 5 depicts an exemplary method of optimizing wearable item selection in electronic clothing subscription platform, according to exemplary embodiments of the present disclosure.

FIG. 5 depicts an exemplary method 500 of assigning wearable items in a subscription electronics transactions platform, according to exemplary embodiments of the present disclosure. It is understood that the steps depicted in and described with reference to FIG. 5 may be performed in any order, e.g., in parallel. As shown in FIG. 5, in step 502, one or more processors may generate a grid based on information regarding historically shipped wearable items. In some embodiments, the grid may comprise at least a first cell and a second cell, wherein each cell may include a portion of the information regarding historically shipped wearable items corresponding to: (i) a category of percentages indicating how many wearable items have been used per number of wearable items shipped, and (ii) a category of predictive wearability metrics for wearable items indicative of a propensity of a user to use the wearable items. In some embodiments, the category regarding the percentages may include a range of percentages, and the category regarding the predictive wearability metrics may include a range of predictive wearability metrics.

In step 504, the one or more processors may determine an average percentage indicating how many wearable items have been used per number of wearable items shipped for each cell. In step 506, the one or more processors may determine an average predictive wearability metric for wearable items indicative of a propensity of a user to use the wearable items for each. In step 508, the one or more processors may generate a mapping configured to convert a predictive wearability metric to a squashed predictive wearability metric at least based on the average percentage and the average predictive wearability metric for each cell. In some embodiments, generating the mapping may include determining a first difference metric indicating a difference in average percentage per difference in average predictive wearability metric between the first cell and the second cell, and the generated mapping may include the first difference metric and the average percentage and wearability metric for the first cell. In some embodiments, generating the mapping may include determining, for the first cell, an extrapolated percentage indicating how many wearable items have been used per number of wearable items shipped; and determining, for the first cell, an extrapolated predictive wearability metric.

In some embodiments, the grid may further comprise a third cell and the determined average predictive wearability metric for the first cell may be lower than the determined average predictive wearability metric for the second cell, and the determined average predictive wearability metric for the second cell may be lower than the determined average predictive wearability metric for the third cell. In such embodiments, generating the mapping may further include (i) determining a second difference metric indicating a difference in average percentage per difference in average predictive wearability metric between the second cell and the third cell, and (ii) associating the second slop metric with the second cell.

In some embodiments, method 500 may further include determining a number of observations for each cell; comparing the determined number of observation for the first cell to a predetermined threshold; and removing the first cell and the associated information regarding historically shipped wearable items from the grid as a result of determining that the predetermined threshold exceeds the determined number of transactions for the first cell.

Figure 6:
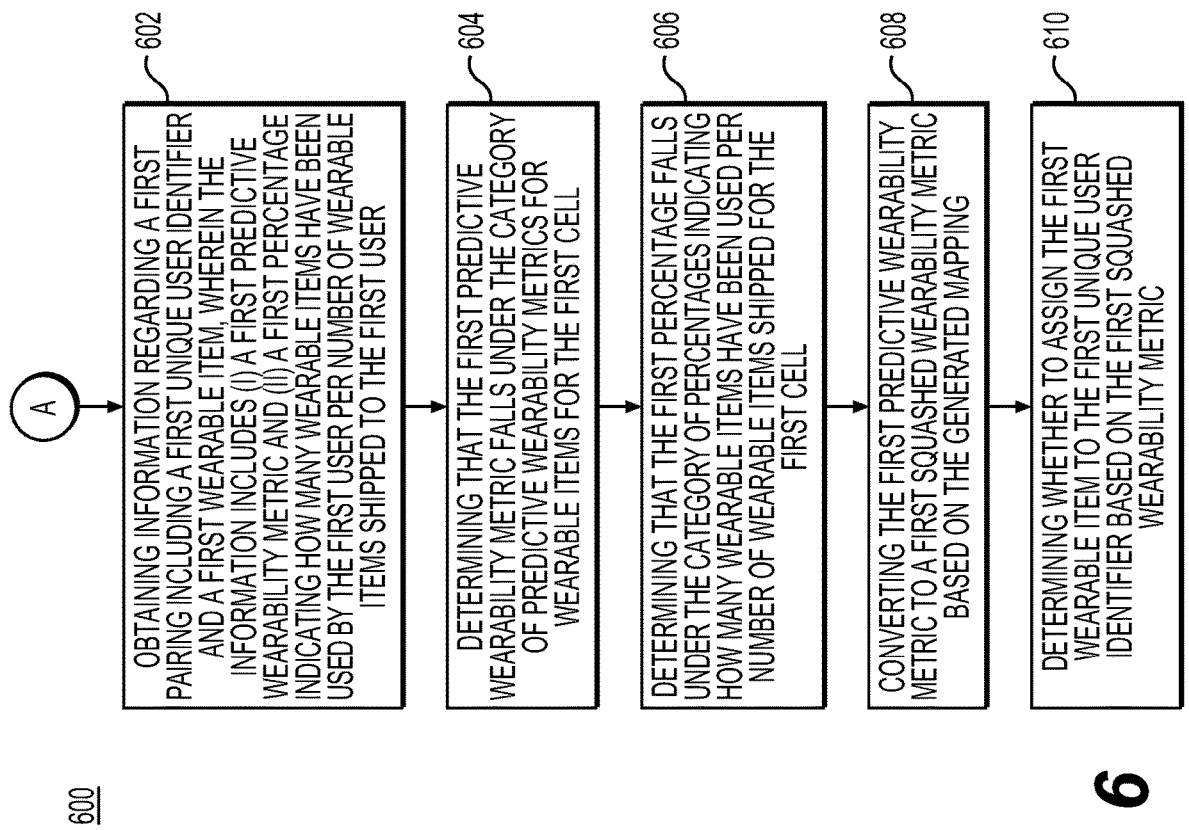
FIG. 6 depicts an exemplary method of optimizing wearable item selection in electronic clothing subscription platform, according to exemplary embodiments of the present disclosure.

FIG. 6 depicts an exemplary method 600 of assigning wearable items in a subscription electronics transactions platform, according to exemplary embodiments of the present disclosure. In some embodiments, method 600 may be an extension of method 500 as described above with reference to FIG. 5. For example, step 602 of method 600 may follow step 510 of method 500. It is understood, however, that the steps depicted in and described with reference to FIGS. 5-6 may be performed in any order, e.g., in parallel.

In step 602, one or more processors may obtain information regarding a first pairing including a first unique user identifier and a first wearable item. In some embodiments, the information may include (i) a first predictive wearability metric associated with the first unique user identifier and the first wearable item, and (ii) a first percentage indicating how many wearable items have been used by the first user per number of wearable items shipped to the first user. In step 604, the one or more processors may determine that the first predictive wearability metric falls under the category of predictive wearability metrics for wearable items for the first cell. In step 606, the one or more processors may determine that the first percentage falls under the category of percentages indicating how many wearable items have been used per number of wearable items shipped for the first cell. In step 608, the one or more processors may convert the first predictive wearability metric to a first squashed wearability metric based on the generated mapping. In some embodiments, converting the first predictive wearability metric to the first squashed wearability metric may include obtaining the first difference metric and the average percentage and wearability metric for the first cell; and determining the first squashed wearability metric based on the first predictive wearability metric, the first difference metric, and the average percentage and wearability metric for the first cell. In step 610, the one or more processors may determine whether to assign the first wearable item to the first unique user identifier based on the first squashed wearability metric and/or the first predictive wearability metric.

In some embodiments, the first predictive wearability metric may indicate a propensity of a first user associated with the first unique user identifier to use the first wearable item.

Figure 7:
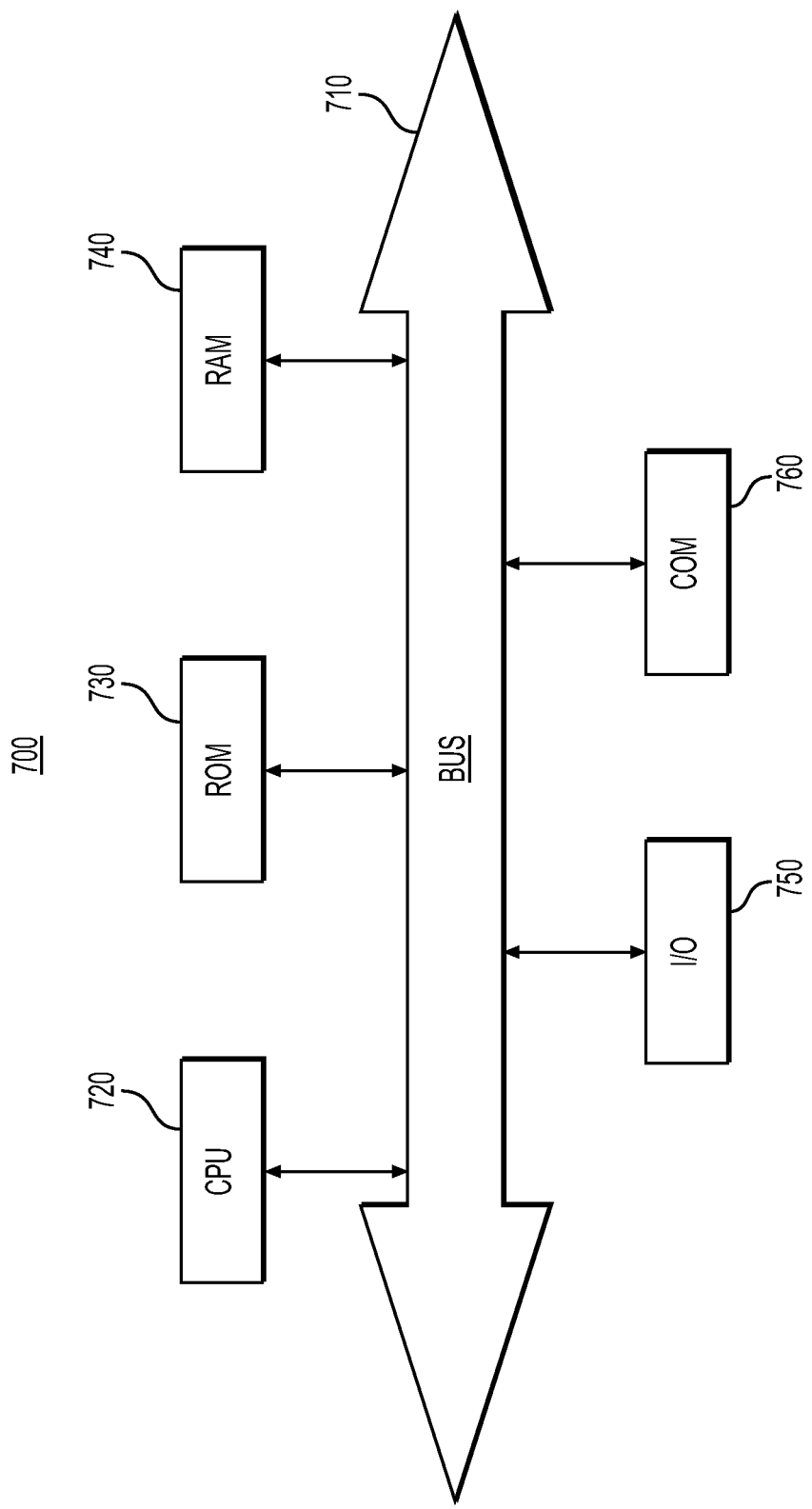
FIG. 7 depicts an exemplary computer device or system, in which embodiments of the present disclosure, or portions thereof, may be implemented.

As shown in FIG. 7, a device 700 used for performing the various embodiments of the present disclosure may include a central processing unit (CPU) 720. CPU 720 may be any type of processor device including, for example, any type of special purpose or a general-purpose microprocessor device. In some embodiments, any combination of components depicted in the environment 100 of FIG. 1 and/or in the environment 200 of FIG. 2 may correspond to device 700. As will be appreciated by persons skilled in the relevant art, CPU 720 also may be a single processor in a multi-core/ multiprocessor system, such system operating alone, or in a cluster of computing devices operating in a cluster or server farm. CPU 720 may be connected to a data communication infrastructure 710, for example, a bus, message queue, network, or multi-core message-passing scheme.

A device 700 may also include a main memory 740, for example, random access memory (RAM), and may also include a secondary memory 730. In some embodiments, any combination of components depicted in the environment 100 of FIG. 1 and/or in the environment 200 of FIG. 2 may correspond to device 700. Secondary memory, e.g., a read-only memory (ROM), may be, for example, a hard disk drive or a removable storage drive. Such a removable storage drive may comprise, for example, a floppy disk drive, a magnetic tape drive, an optical disk drive, a flash memory, or the like. The removable storage drive in this example reads from and/or writes to a removable storage unit in a well-known manner. The removable storage unit may comprise a floppy disk, magnetic tape, optical disk, etc., which is read by and written to by the removable storage drive. As will be appreciated by persons skilled in the relevant art, such a removable storage unit generally includes a computer usable storage medium having stored therein computer software and/or data.

In alternative implementations, secondary memory 730 may include other similar means for allowing computer programs or other instructions to be loaded into device 700. Examples of such means may include a program cartridge and cartridge interface (such as that found in video game devices), a removable memory chip (such as an EPROM, or PROM) and associated socket, and other removable storage units and interfaces, which allow software and data to be transferred from a removable storage unit to device 700.

A device 700 may also include a communications interface ("COM") 760. Communications interface 760 allows software and data to be transferred between device 700 and external devices. Communications interface 760 may include a modem, a network interface (such as an Ethernet card), a communications port, a PCMCIA slot and card, or the like. Software and data transferred via communications interface may be in the form of signals, which may be electronic, electromagnetic, optical, or other signals capable of being received by communications interface 760. These signals may be provided to communications interface 760 via a communications path of device 700, which may be implemented using, for example, wire or cable, fiber optics, a phone line, a cellular phone link, an RF link or other communications channels.

The hardware elements, operating systems, and programming languages of such equipment are conventional in nature, and it is presumed that those skilled in the art are adequately familiar therewith. A device 700 also may include input and output ports 750 to connect with input and output devices such as keyboards, mice, touchscreens, monitors, displays, etc. Of course, the various server functions may be implemented in a distributed fashion on a number of similar platforms, to distribute the processing load. Alternatively, the servers may be implemented by appropriate programming of one computer hardware platform.

The systems, apparatuses, devices, and methods disclosed herein are described in detail by way of examples and with reference to the figures. The examples discussed herein are examples only and are provided to assist in the explanation of the apparatuses, devices, systems, and methods described herein. None of the features or components shown in the drawings or discussed below should be taken as mandatory for any specific implementation of any of these the apparatuses, devices, systems, or methods unless specifically designated as mandatory. For ease of reading and clarity, certain components, modules, or methods may be described solely in connection with a specific figure. In this disclosure, any identification of specific techniques, arrangements, etc. are either related to a specific example presented or are merely a general description of such a technique, arrangement, etc. Identifications of specific details or examples are not intended to be, and should not be, construed as mandatory or limiting unless specifically designated as such. Any failure to specifically describe a combination or sub-combination of components should not be understood as an indication that any combination or sub-combination is not possible. It will be appreciated that modifications to disclosed and described examples, arrangements, configurations, components, elements, apparatuses, devices, systems, methods, etc. can be made and may be desired for a specific application. Also, for any methods described, regardless of whether the method is described in conjunction with a flow diagram, it should be understood that unless otherwise specified or required by context, any explicit or implicit ordering of steps performed in the execution of a method does not imply that those steps must be performed in the order presented but instead may be performed in a different order or in parallel.

Throughout this disclosure, references to components or modules generally refer to items that logically can be grouped together to perform a function or group of related functions. Like reference numerals are generally intended to refer to the same or similar components. Components and modules can be implemented in software, hardware, or a combination of software and hardware. The term "software" is used expansively to include not only executable code, for example machine-executable or machine-interpretable instructions, but also data structures, data stores and computing instructions stored in any suitable electronic format, including firmware, and embedded software. The terms "information" and "data" are used expansively and includes a wide variety of electronic information, including executable code; content such as text, video data, and audio data, among others; and various codes or flags. The terms "information," "data," and "content" are sometimes used interchangeably when permitted by context.

It is intended that the specification and examples be considered as exemplary only, with a true scope and spirit of the disclosure being indicated by the following claims.

What is claimed is:

1. A computer-implemented method for assigning wearable items in a subscription electronics transactions platform, the method comprising:
generating, by one or more processors, a grid based on information regarding historically shipped wearable items, wherein the grid comprises at least a first cell and a second cell, wherein each cell includes a portion of the information regarding historically shipped wearable items corresponding to: (i) a category of percentages indicating how many wearable items have been used per number of wearable items shipped, and (ii) a category of predictive wearability metrics for wearable items indicative of a propensity of a user to use the wearable items;
utilizing, by the one or more processors, a neural network trained based on information regarding the historically shipped wearable items to determine an average percentage indicating how many wearable items have been used per number of wearable items shipped for each cell;
utilizing, by the one or more processors, the trained neural network to determine an average predictive wearability metric for wearable items indicative of a propensity of a user to use the wearable items for each cell;
generating, by the one or more processors, a mapping configured to convert a predictive wearability metric to a squashed predictive wearability metric at least based on the average percentage and the average predictive wearability metric for each cell, wherein generating the mapping comprises determining a first difference metric indicating a difference in average percentage per difference in average predictive wearability metric between the first cell and the second cell, and wherein the generated mapping includes the first difference metric and the average percentage and wearability metric for the first cell;
obtaining, by the one or more processors, information regarding a first pairing including a first unique user identifier and a first wearable item, wherein the information comprises: (i) a first predictive wearability metric associated with the first unique user identifier and the first wearable item, and (ii) a first percentage indicating how many wearable items have been used by the first user per number of wearable items shipped to the first user;
determining, by the one or more processors, that the first predictive wearability metric falls under the category of predictive wearability metrics for wearable items for the first cell;
determining, by the one or more processors, that the first percentage falls under the category of percentages indicating how many wearable items have been used per number of wearable items shipped for the first cell;
converting, by the one or more processors, the first predictive wearability metric to a first squashed wearability metric based on the generated mapping; and
determining, by the one or more processors, whether to assign the first wearable item to the first unique user identifier based on the first squashed wearability metric and/or the first predictive wearability metric.

2. The method of claim 1, wherein the first predictive wearability metric indicates a propensity of a first user associated with the first unique user identifier to use the first wearable item.

3. The method of claim 1, wherein converting the first predictive wearability metric to the first squashed wearability metric comprises:
obtaining the first difference metric and the average percentage and wearability metric for the first cell; and
determining the first squashed wearability metric based on the first predictive wearability metric, the first difference metric, and the average percentage and wearability metric for the first cell.

4. The method of claim 1, wherein the category regarding the percentages comprises a range of percentages, and wherein the category regarding the predictive wearability metrics comprises a range of predictive wearability metrics.

5. The method of claim 1, wherein generating the mapping further comprises:
determining, for the first cell, an extrapolated percentage indicating how many wearable items have been used per number of wearable items shipped; and
determining, for the first cell, an extrapolated predictive wearability metric.

6. The method of claim 1, wherein the grid further comprises a third cell and the determined average predictive wearability metric for the first cell is lower than the determined average predictive wearability metric for the second cell, and the determined average predictive wearability metric for the second cell is lower than the determined average predictive wearability metric for the third cell, and wherein generating the mapping further comprises: (i) determining a second difference metric indicating a difference in average percentage per difference in average predictive wearability metric between the second cell and the third cell, and (ii) associating the second slop metric with the second cell.

7. The method of claim 1, further comprises:
determining a number of observations for each cell;
comparing the determined number of observation for the first cell to a predetermined threshold; and
as a result of determining that the predetermined threshold exceeds the determined number of transactions for the first cell, removing the first cell and the associated information regarding historically shipped wearable items from the grid.

8. A computer system for assigning wearable items in a subscription electronics transactions platform, the computer system comprising:
a data storage device storing processor-readable instructions; and
a processor configured to execute the instructions to perform a method including:
generating a grid based on information regarding historically shipped wearable items, wherein the grid comprises at least a first cell and a second cell, wherein each cell includes a portion of the information regarding historically shipped wearable items corresponding to: (i) a category of percentages indicating how many wearable items have been used per number of wearable items shipped, and (ii) a category of predictive wearability metrics for wearable items indicative of a propensity of a user to use the wearable items;
utilizing a neural network trained based on information regarding the historically shipped wearable items to determine an average percentage indicating how many wearable items have been used per number of wearable items shipped for each cell;

utilizing the trained neural network to determine an average predictive wearability metric for wearable items indicative of a propensity of a user to use the wearable items for each cell;

generating a mapping configured to convert a predictive wearability metric to a squashed predictive wearability metric at least based on the average percentage and the average predictive wearability metric for each cell, wherein generating the mapping comprises determining a first difference metric indicating a difference in average percentage per difference in average predictive wearability metric between the first cell and the second cell, and wherein the generated mapping includes the first difference metric and the average percentage and wearability metric for the first cell;

obtaining information regarding a first pairing including a first unique user identifier and a first wearable item, wherein the information comprises: (i) a first predictive wearability metric associated with the first unique user identifier and the first wearable item, and (ii) a first percentage indicating how many wearable items have been used by the first user per number of wearable items shipped to the first user;

determining that the first predictive wearability metric falls under the category of predictive wearability metrics for wearable items for the first cell;

determining that the first percentage falls under the category of percentages indicating how many wearable items have been used per number of wearable items shipped for the first cell;

converting the first predictive wearability metric to a first squashed wearability metric based on the generated mapping; and determining whether to assign the first wearable item to the first unique user identifier based on the first squashed wearability metric and/or the first predictive wearability metric.

9. The computer system of claim 8, wherein the first predictive wearability metric indicates a propensity of a first user associated with the first unique user identifier to use the first wearable item.

10. The computer system of claim 8, wherein converting the first predictive wearability metric to the first squashed wearability metric comprises:

obtaining the first difference metric and the average percentage and wearability metric for the first cell; and determining the first squashed wearability metric based on the first predictive wearability metric, the first difference metric, and the average percentage and wearability metric for the first cell.

11. The computer system of claim 8, wherein the category regarding the percentages comprises a range of percentages, and wherein the category regarding the predictive wearability metrics comprises a range of predictive wearability metrics.

12. The computer system of claim 8, wherein generating the mapping further comprises:

determining, for the first cell, an extrapolated percentage indicating how many wearable items have been used per number of wearable items shipped; and determining, for the first cell, an extrapolated predictive wearability metric.

13. The computer system of claim 8, wherein the grid further comprises a third cell and the determined average predictive wearability metric for the first cell is lower than the determined average predictive wearability metric for the second cell, and the determined average predictive wearability metric for the second cell is lower than the determined average predictive wearability metric for the third cell, and wherein generating the mapping further comprises: (i) determining a second difference metric indicating a difference in average percentage per difference in average predictive wearability metric between the second cell and the third cell, and (ii) associating the second slop metric with the second cell.

14. The computer system of claim 8, wherein the method further comprises:

determining a number of observations for each cell;

comparing the determined number of observation for the first cell to a predetermined threshold; and as a result of determining that the predetermined threshold exceeds the determined number of transactions for the first cell, removing the first cell and the associated information regarding historically shipped wearable items from the grid.

15. A non-transitory computer-readable medium containing instructions that, when executed by a processor, cause the processor to perform a method comprising:

generating a grid based on information regarding historically shipped wearable items, wherein the grid comprises at least a first cell and a second cell, wherein each cell includes a portion of the information regarding historically shipped wearable items corresponding to: (i) a category of percentages indicating how many wearable items have been used per number of wearable items shipped, and (ii) a category of predictive wearability metrics for wearable items indicative of a propensity of a user to use the wearable items;

utilizing a neural network trained based on information regarding the historically shipped wearable items to determine an average percentage indicating how many wearable items have been used per number of wearable items shipped for each cell;

utilizing the trained neural network to determine an average predictive wearability metric for wearable items indicative of a propensity of a user to use the wearable items for each cell;

generating a mapping configured to convert a predictive wearability metric to a squashed predictive wearability metric at least based on the average percentage and the average predictive wearability metric for each cell, wherein generating the mapping comprises determining a first difference metric indicating a difference in average percentage per difference in average predictive wearability metric between the first cell and the second cell, and wherein the generated mapping includes the first difference metric and the average percentage and wearability metric for the first cell;

obtaining information regarding a first pairing including a first unique user identifier and a first wearable item, wherein the information comprises: (i) a first predictive wearability metric associated with the first unique user identifier and the first wearable item, and (ii) a first percentage indicating how many wearable items have been used by the first user per number of wearable items shipped to the first user;

determining that the first predictive wearability metric falls under the category of predictive wearability metrics for wearable items for the first cell;

determining that the first percentage falls under the category of percentages indicating how many wearable items have been used per number of wearable items shipped for the first cell;

converting the first predictive wearability metric to a first squashed wearability metric based on the generated mapping; and determining whether to assign the first wearable item to the first unique user identifier based on the first squashed wearability metric and/or the first predictive wearability metric.

16. The non-transitory computer-readable medium of claim 15, wherein the first predictive wearability metric indicates a propensity of a first user associated with the first unique user identifier to use the first wearable item, wherein the category regarding the percentages comprises a range of percentages, and wherein the category regarding the predictive wearability metrics comprises a range of predictive wearability metrics.

17. The non-transitory computer-readable medium of claim 15, wherein converting the first predictive wearability metric to the first squashed wearability metric comprises:

obtaining the first difference metric and the average percentage and wearability metric for the first cell; and determining the first squashed wearability metric based on the first predictive wearability metric, the first difference metric, and the average percentage and wearability metric for the first cell.

18. The non-transitory computer-readable medium of claim 15, wherein generating the mapping further comprises:

determining, for the first cell, an extrapolated percentage indicating how many wearable items have been used per number of wearable items shipped; and determining, for the first cell, an extrapolated predictive wearability metric.

19. The non-transitory computer-readable medium of claim 15, wherein the grid further comprises a third cell and the determined average predictive wearability metric for the first cell is lower than the determined average predictive wearability metric for the second cell, and the determined average predictive wearability metric for the second cell is lower than the determined average predictive wearability metric for the third cell, and wherein generating the mapping further comprises: (i) determining a second difference metric indicating a difference in average percentage per difference in average predictive wearability metric between the second cell and the third cell, and (ii) associating the second slop metric with the second cell.

20. The non-transitory computer-readable medium of claim 15, wherein the method further comprises:

determining a number of observations for each cell;

comparing the determined number of observation for the first cell to a predetermined threshold; and as a result of determining that the predetermined threshold exceeds the determined number of transactions for the first cell, removing the first cell and the associated information regarding historically shipped wearable items from the grid.

\* \* \* \* \*